INVENTORS
EUGEN WEBER

3,433,862
METHOD OF FORMING ARTICLES FROM THERMOELASTICALLY DEFORMABLE MATERIALS
Eugen Weber, Zurich, Switzerland, assignor, by mesne assignments, to H. Dudley Wright, Yvoire, Haute-Savoie, France, and Robert Ernest Leclerc, Geneva, Switzerland
Filed Feb. 8, 1966, Ser. No. 525,903
Claims priority, application Great Britain, Feb. 22, 1965, 7,666/65
U.S. Cl. 264—97       7 Claims
Int. Cl. B29f 3/08

ABSTRACT OF THE DISCLOSURE

A method of forming hollow thin-walled articles by extruding a thermoelastically deformable material in such a manner that the extruded material will have a biaxially oriented structure which will thus provide greater biaxial strength. This biaxial orientation is accomplished by extruding the thermoelastically deformable material through a narrow gap and then permitting flow laterally outwards in all directions while maintaining the material at a temperature within its softening range.

---

This invention relates to the forming of articles from thermoelastically deformable thermoplastics, and has for an object to provide a process for the manufacture of articles—especially containers or packages for drugs, foodstuffs, cigarettes and other commodities—which use a minimum of material whilst exhibiting a satisfactorily high degree of impact strength and dimensional stability under conditions of normal use.

It is already known to produce containers such as boxes, beakers and the like by injection molding into a die from a completely molten starting material. It is also known to produce containers by blow molding or by a drawing process from an extruded and calendered sheet of material. All these processes, however, suffer from certain mechanical and economic disadvantages. For example, the injection molding of hollow articles normally results in mechanical weakness across the direction of flow, which results in a marked tendency of the articles to crack longitudinally under stresses applied transversely of the axis. Similarly, the drawing process starting from a sheet of material normally results in a loss of mechanical strength at the rim or mouth of the article. Further, in both the above known processes, it is difficult to form deep hollow bodies.

A major disadvantage of the blow molding process is the localised thinning of the walls which can only be eliminated or reduced to within tolerable limits by complicated controls. Furthermore, it is not possible to blow mold sharp corners, and allowance must always be made in designing blow molded articles for the introduction of a relatively large radius at a corner. Even when this is done, there is a strong risk that the wall thickness at such corners will be reduced, rendering them liable to fracture in use. Also, there is a transition at the corner where base and walls meet between an orientated structure in the walls and a non-orientated structure in the base which adds to the weakness at this point.

The present invention is a method of forming articles from a thermoelastically deformable thermoplastic material which comprises heating a slug of the material to a temperature within its softening range and then extruding the slug laterally in all directions simultaneously into a narrow mold cavity of the size and shape of the required finished product so as to ensure the formation of a biaxially orientated structure in the material over at least the greater part of the article.

When the extrusion step has been completed, the product is allowed to cool below its softening range so that the orientation is frozen, and the product can be stripped from the mold.

Preferably, the temperature of the slug at the instant of injection into the mold cavity is kept at a value near the lower end of the softening range.

The temperature of the material being molded is maintained below its melting point and above its freezing point during the extruding process by proper control of the temperature of the core and the rate of extrusion.

Advantageously, the mold consists of a core and an outer mold part, and the slug is of a size such that the ratio of its cross-sectional area to the projected area of the core is less than unity.

When it is desired to extrude a product having embossed or non-parallel walls, involving the formation of re-entrant curvatures, the outer mold walls are formed to the desired contour but the core surface is smooth and of a cross-section which is constant or at least does not decrease in the direction of flow of the material, depending on the required finished shape of the article. In order to form the material to the contour of the outer mold walls where they depart from parallelism to the core, a fluid is injected under pressure between the core and the sleeve of extruded material covering it, care being taken to ensure that a fluid-tight seal is maintained between the material and the core at the appropriate point or points. The build-up of fluid pressure between the material and the core than dilates the material into contact with the outer mold wall, further material being injected during this operation as necessary to prevent thinning of the dilated material. In this way, relatively complicated shapes can be formed without destruction of the biaxial orientation of the structure of the material.

The process according to the present invention can be used to produce articles having a uniform wall thickness of less than 0.2 mm., whilst the wall strength in the peripheral direction transverse to the direction of flow of the material is considerably greater than can be obtained by the above-mentioned known methods. Consequently, a significant saving in material can be realised, and since the cost of the material forms a high proportion of the total manufacturing cost, the process according to the invention offers an economic advantage over the known methods.

The essential feature of the present invention is the working of the material by flowing it in a softened state and under conditions which ensure the maintenance of thermoelasticity for the establishment of a biaxially orientated structure, and especially peripherally transverse to the direction of flow of the material. This structure is obtained if the original slug, in the state of plasticity which obtains within the softening range (as this term is commonly understood in the art), is deformed against a resistance due to viscosity and external friction on the flowing material.

Figure 1:
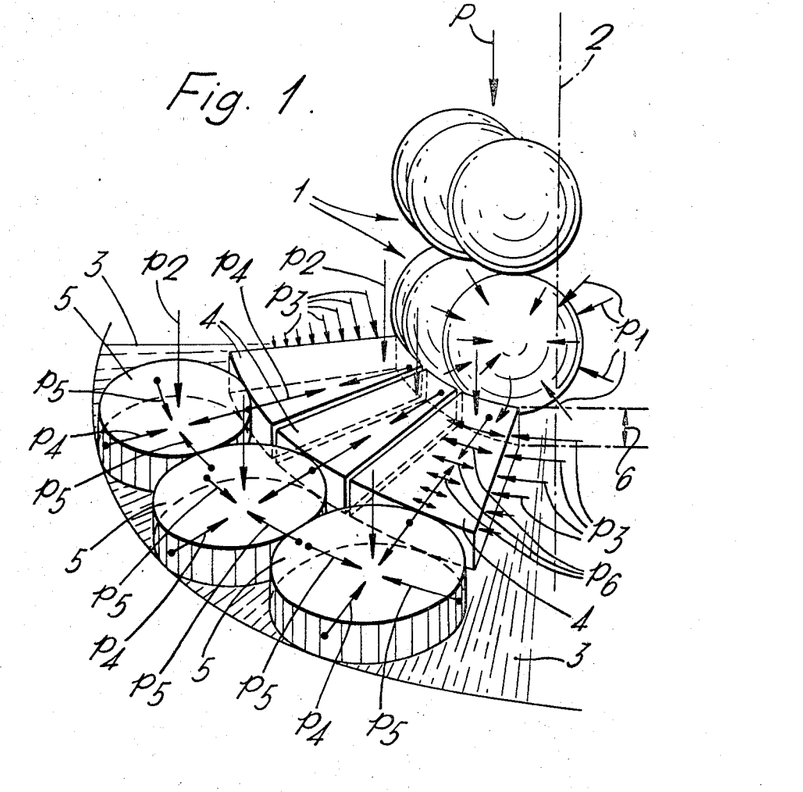

A highly schematic pictorial analogue of the process is shown in the perspective view of FIGURE 1 of the accompanying drawings in which the original slug is represented as being composed of a number of spherical bundles or balls of macromolecules 1 (only a few are shown) in close contact with each other around the slug axis 2 and confined in an axial pre-injection space. The axis 2 is also assumed to be the axis of the mold cavity.

The extruding force acts on the slug in the direction of the arrow P and this creates an external radially compressive force $p_1$ on each sphere of ball 1, both from its neighbours in the slug and from the walls of the pre-injection space. The entry to the mold cavity is an annular gap 6 whose height is much less than the diameter of a ball 1. Consequently, when a ball 1 begins to extrude through the annular gap 6, it deforms into a flattened shape under the external axial pressure $p_2$ exerted by the top and bottom walls (the latter is seen at 3) of the annular passage which leads to the side wall of the mold cavity.

Since the material is thermoelastic and is being extruded at a temperature below its melting point, it obeys Hooke's law, although the value of E is considerably reduced, so that a given internal stress is produced by a much greater strain or deformation. Consequently, the deforming ball stretches radially into the annular passage 3, experiencing peripheral compressive forces $p_3$ which are initially equal to the sum of $p_1$ and the retaining forces $p_2$ exerted by the walls of the mold. These forces are opposed by internal cohesive forces $p_4$ and by internal compressive forces $p_6$.

As each bundle of molecules is forced radially outwards, the progressively increasing peripheral dimension of the annular passage 3 results in progressive reduction of the peripheral compressive force $p_3$, permitting lateral expansion of the bundle, until eventually the original ball 1 has become entirely flattened into a wedge-shaped bundle 4 having a distribution of peripheral compressive stresses as indicted by the lengths of the arrows $p_3$. Continued extrusion allows progressive relief of the forces $p_3$ while the axial compressive forces $p_2$ remain constant.

Eventually, therefore, each bundle, which is still elastic, assumes a disc-like or lenticular shape as shown at 5 which is being acted upon by external retaining forces $p_2$ in the axial direction and $p_4$ and $p_5$ due to cohesion in the radial and peripheral directions respectively. The extent to which thermoelastic deformation has then occurred along the axes of the radial and peripheral forces determines the degree of biaxial orientation in the frozen material.

A series of tests was carried out to determine the degree of biaxial orientation after extrusion of slugs of three different thermoelastic plastics at temperatures within the softening ranges into a mold cavity of constant height—0.2 mm. The amount of elastic deformation along two axes at right angles was measured as the ratio of the extruded dimension along each axis to the corresponding dimension after relaxation by heating to the original slug temperature. The materials tested were:

(A) "Kalle" PVC, calendering grade
(B) High impact PVC, compound No. XXVII
(C) Impact styrene The results were as follows:

| Material | A | A | B | B | B | C |
|---|---|---|---|---|---|---|
| Shrink ratios: | | | | | | |
| $p_4$ Axis | 1.62:1 | 1.88:1 | 2.18:1 | 1.67:1 | 1.84:1 | 1.17:1 |
| $p_5$ Axis | 1.29:1 | 1.48:1 | 1.07:1 | 1.31:1 | 1.31:1 | 1.11:1 |
| Uniformity ($p_4/p_5$ percent) | 80 | 80 | 49 | 79 | 72 | 95 |

The last line of the above table expresses the degree of uniformity of biaxial orientation achieved in each sample as the percentage ratio between the two shrink ratios determined for each test specimen.

For any given mold and material the speed of extrusion will be important. The combination of low speed and relatively low mold temperature may lead to premature freezing of the material before biaxial orientation has been established, whilst high speed and high mold temperature may lead to local melting of the material due to frictional heat generated in it. The degree of biaxial orientation is largely dependent on the temperature of the slug, and also on the resistance to extrusion due to viscosity and friction. The latter calls for a careful control of pressure at the extrusion ram.

For economy of operation of the process, the speed of extrusion should be as high as possible and the extrusion pressure should be as low as possible. To satisfy both these requirements, the slug temperature should be as near the melting point of the material as is practicable; but it has already been noted that if the working temperature is too high there is a danger that local melting may occur as a result of frictional heat generated in the flowing material. The optimum operating parameters of any given system will, therefore, normally be a compromise between conflicting desiderata.

Practical embodiments of the present invention will now be described, by way of example only, with reference to the accompanying drawings in which.

Figure 2:
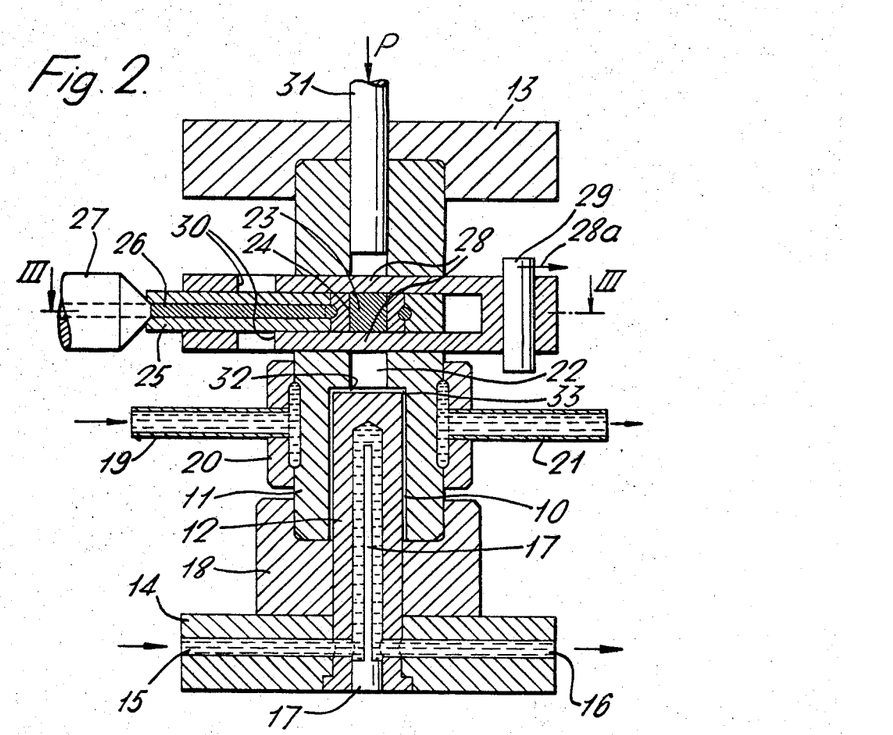
FIGURE 2 is a sectional elevation of a first form of machine for forming a hollow cylindrical cup.
Figure 3:
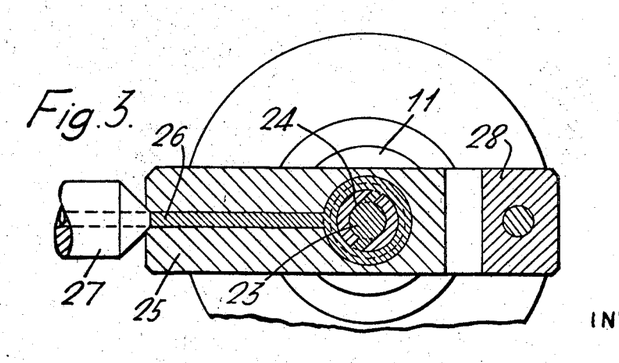
FIGURE 3 is a section on the line III—III of FIGURE 2.
Figure 4:
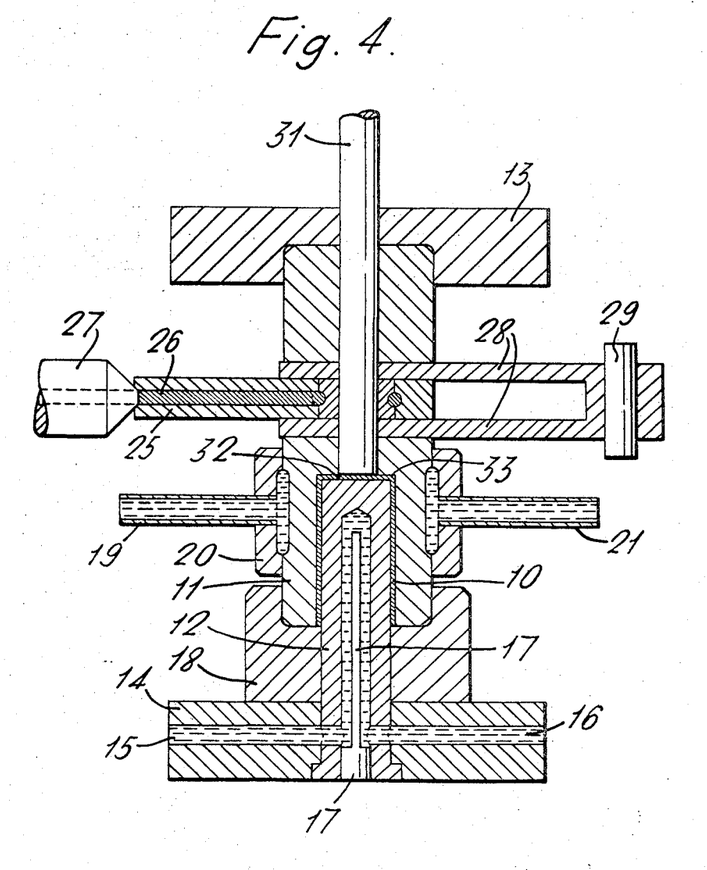
FIGURE 4 is a section similar to FIGURE 2 showing the parts in their respective positions at the end of the extrusion operation.

Referring first to FIGURES 2–4, a narrow mold cavity 10 for forming a thin-walled deep cylindrical cup is defined by an outer mold part 11 and an inner core 12. The outer mold part 11 is carried by a bridge 13 forming part of the machine frame, and the core 12 is carried by an axially reciprocable head 14 having a cooling water inlet 15 and outlet 16 for supplying cooling water to to an axial bore within the core. This bore is divided by a partition 17 to establish a circulation path within the bore. Surrounding the core 12 is a slidable stripper block 18 for stripping the formed cup from the core after the head 14 has been retracted downwards to withdraw the core and the cup from the outer mold part 11.

The outer mold part 11 is surrounded by a cooling water jacket 20 having water inlet and outlet pipes 19, 21 respectively.

Above the mold cavity 10 is an axial pre-injection slug cavity 22 which can accommodate as a close fit a slug 23. This slug is injection molded into a chamber 24 in a fixed header 25. Thermoelastically deformable material is injected into the chamber 24 through a canal 26 from a nozzle 27. The chamber 24 is coaxial with the mold cavity 10 and the pre-injection cavity 22.

On either side of the slug injection header 25 lie the parallel limbs 28 of a bifurcated slide which is laterally reciprocable by a mechanism (not shown) acting on a pin 29. Near the free ends of the limbs 28 are coaxially aligned guide holes 30 of a diameter just greater than that of a punch or ram 31 which is reciprocable in the upper end of the outer mold part 11.

With the parts in the positions shown in FIGURE 2, the slug chamber 24 is closed by the limbs 28 of the slide so that material can be injected thereinto from the nozzle 27. As soon as the correct volume of slug has been formed, the slide 28 is moved in the direction of the arrow 28a to bring the holes 30 into register with the chamber 24 so that the ram 31 can be advanced therethrough by a force represented by the arrow P to carry the slug first into the pre-injection cavity 22. As soon as the slug 23 meets the end of the core 12, it begins to be deformed laterally into the mold cavity 10 at the extrusion gap 32, which subtends an arc of 360° about the central axis of the mold cavity. By the time that the material has spread radially outwards over the base section of the cavity 10 to the point 33, which marks the beginning of the wall section of the mold cavity, biaxial orientation has been established in the material. In the actual construction illustrated in FIGURES 2–4, the ratio of the cross-sectional area of the slug 23 to the area of the base of the cup at the point 33 is approximately 1:4, but for certain materials a ratio as high as 1:2 or even higher (but less than 1:1) may be sufficient to establish biaxial orientation in the cup wall.

During the molding operation the thermoelastically deformable material should be maintained at a temperature within the softening range of said material, i.e., below its melting temperature and above its freezing temperature. To assure this the core 12 is maintained at a temperature below the softening range of the molding material by the controlled flow of the cooling water in the circulation path, as referred to above. Further, the rate of extrusion is controlled to maintain the temperature of the molding material below its melting point, but above the point at which this material freezes, thereby establishing a bi-axially oriented structure throughout substantially all of the molded structure.

When injection of the slug 23 is complete, the core header 14 is retracted downwards to remove the core 12, with the formed cup on it, from the outer mold part 11. As soon as the core is clear of the mold, the stripping block 18 is arrested while the header 14 continues to descend. The core 12 is thus withdrawn through the block 18 and the latter strips the cup from the core. Any excess length of wall can be trimmed off as will be understood.

FIGURES 5–8 show the extrusion of a thin-walled deep rectangular box such as a cigarette carton. In the machine illustrated, the ram 31 is of rectangular section and moves upwards from below the bridge 13 on its extrusion stroke. The retractable core 12 is also of rectangular shape with smooth flat sides and sharply radiused corners, and has one or more longitudinal internal fluid pressure ducts 34 which terminate at their lower ends within the core 12. Cross-ducts 35 open from each longitudinal duct 34 through the side walls of the core, and a pressure fluid inlet connection 36 at the upper end of the core 12 leads into the longitudinal duct 34 and is connected to a source of, say, compressed air (not shown).

Figure 5:
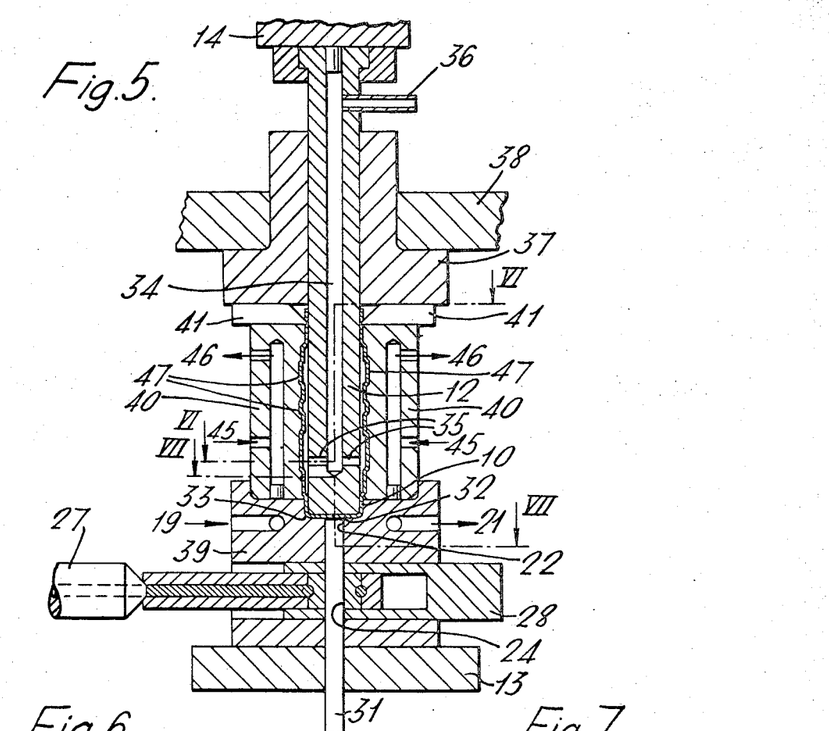
FIGURE 5 is a sectional elevation of a second form of machine.

The core 12 slides in a stripper block 37 carried in a frame member 38 and between the under face of the stripper block 37 and the top face of an upper outer mold part 40 are mounted four L-shaped knives or cutters 41. Near their corners, the cutters 41 are obliquely slotted at 42 (FIGURE 6) to fit over flat-sided guide pins 43 fixed in the stripper block 37. A linkage (not shown) interconnects all four cutters 41 to control their simultaneous inward and outward movements on the pins 43, as will be described below.

The outer mold part is in two main sections 39, 40. The lower section 39 contains the pre-injection cavity 22, extrusion gap 32, and an initial section of the mold cavity 10 extending beyond the point 33 for a short distance up the side walls. The remainder of the outer wall surfaces of the cavity 10 are defined by the upper mold section 40 which is longitudinally split. The surface temperature of the cavity wall in the lower main mold section 39 is controlled at a value below the softening point of the material by means of an internal duct 20 having water inlet and outlet connections 19, 21. When the upper mold section 40 is closed for the injection process, the separable components are locked in their closed position by means of a recess 44 (see FIGURE 8) in the top face of the lower main section 39. Additional clamping means for the separable components of the upper split mold section 40 may be provided if required.

The temperature of the outer walls of the cavity 10 is controlled at a value below the softening point of the material by means of a water jacket having inlet and outlet water connections 45, 46. These outer cavity walls are also shown indented at 47 to enable the finished product X to have lettering or a design embossed thereon.

When the mold is closed, as shown in FIGURE 5, a slug 23 is injected into the mold cavity 10 by the ram 31. The process is the same as in FIGURES 2–4, except that the extruded material first flows up the smooth flat surfaces of the core 12 without entering the indentations 47. The cutters 41 during this stage of the process are retracted on the pins 43 so that their inner cutting edges are clear of the surface of the core 12. The material can thus flow up the core past the cutters, whose position defines the required wall height in the finished product.

It will be noted that, as in the case of the apparatus of FIGURES 2–4, the slug is driven against the end of the fixed core 12 axially of it and is diverted laterally in all directions within a plane which is perpendicular to the longitudinal axis of the core. In other words, as it moves through the extrusion gap 32 to the point 33 it flows at an angle of 90° to its original direction of travel. At the point 33 on the periphery of the annular extrusion gap 32, the material is guided axially directly onto the core by the aforementioned initial section of the mold cavity in the lower part 39 of the mold to form a sleeve which at this point is fully oriented biaxially so that it has sufficient strength to move along the core without collapsing.

As soon as the injection has been completed, the cutters 41 are advanced inwards to sever the excess material 48 (FIGURE 8) and to cause the cut edge to form a pressure-tight seal on the surface of the core 12. Air (or other fluid) under pressure is now introduced through the longitudinal duct 34 and is applied through the cross-ducts 35 to the interior of the sleeve of material on the core 12. When the sleeve lies opposite an indentation 47, the material is expanded into it. When this process is complete, the outer mold sections 39, 40 are unlocked, the bridge 13 and lower mold section 39 are lowered and the core 12 is retracted upwards through the stripper block 37 and the cutters 41, which are held in their inward positions during this operation. In order to enable the severed excess material 48 to be removed, the cutters 41 are arranged to be bodily displaceable downwards on their guide pins 43 (see FIGURE 8).

Figure 9:
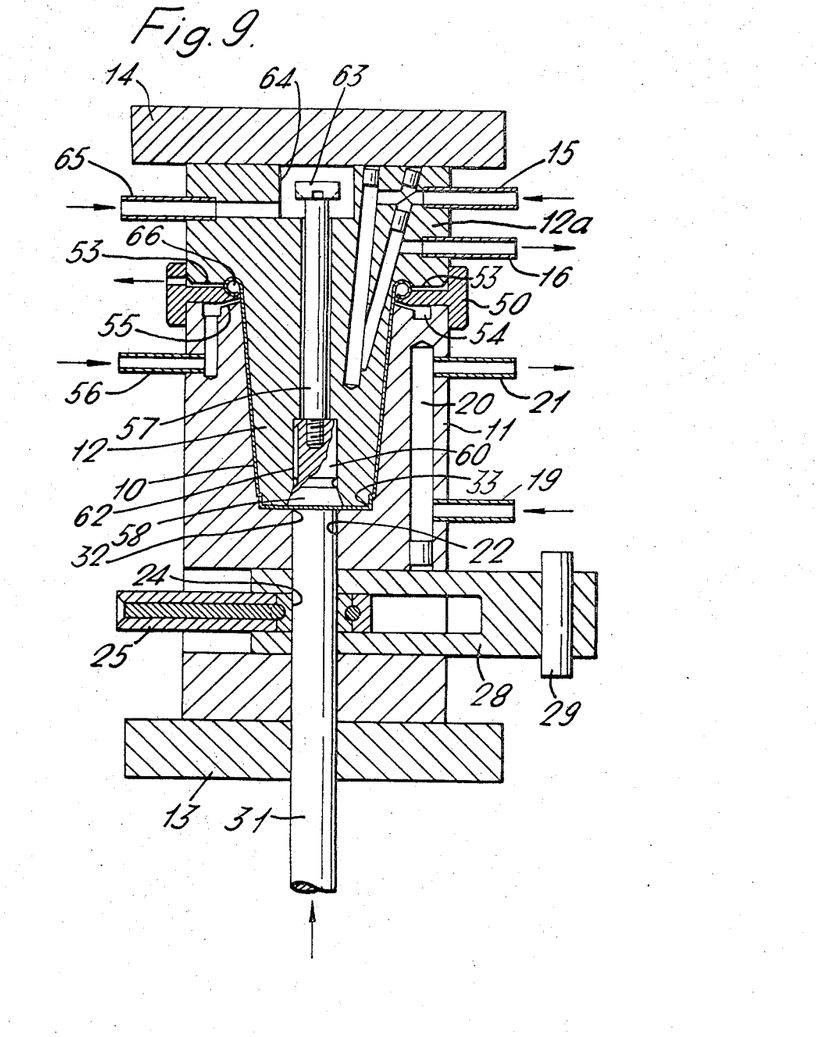
FIGURE 9 is a sectional elevation of a third form of machine.
Figure 10:
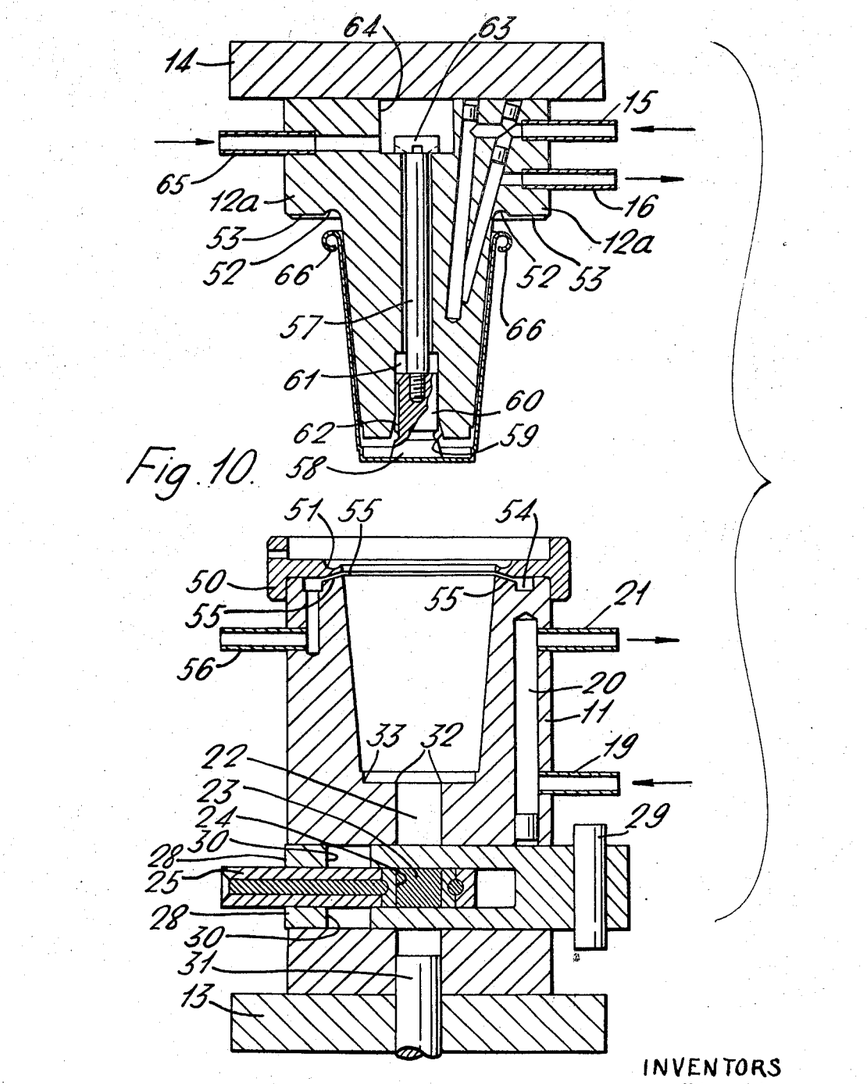
FIGURE 10 is a view similar to FIGURE 9 showing the mold open ready for stripping of the formed article.

FIGURES 9 and 10 show a machine for forming a taper-walled cup with rolled-over rim. In this machine, the outer mold part 11 carries a top ring 50 which has a part-circular section annular groove 51 (FIGURE 10) which registers with a complementary annular groove 52 formed at the junction between the conical surface of the core 12 and an integral flange 12a. This flange overlies the top ring 50 and holds it tight against the outer mold part 12 in the closed position of the parts (FIGURE 9). Grooves 53 (FIGURE 10) are machined radially at selected points in the under surface of the flange 12a to permit the escape of trapped air (as will be described below).

The top surface of the mold part 11 also has an annular air duct 54 machined therein, this duct being normally sealed by the flange 12a except for a narrow radial gap 55 which is directed slightly upwards towards the core 12 to provide a continuous annular nozzle. Air under pressure can be supplied to this nozzle 55 through an inlet 56.

The core temperature is controlled by an internal water circulation system (not shown) through flow and return connections 15, 16. The core 12 is also axially bored to receive as a slack fit an ejection or stripper rod 57 terminating at its lower end in a conical head 58 which is a gas-tight fit in a complementary socket 59 machined in the lower end of the axial bore. A short cylindrical guide stem 60 above the head is freely reciprocable in a corresponding recess 61 and has a longitudinal air bleed passage 62 formed at one or more points around its circumference. The upper end of the stripper rod 57 has a head 63 which is accommodated in an enlarged pocket 64 in the top of the core 12. An air pressure line 65 is connected to this pocket, and the arrangement is such that air under pressure can pass from the pocket 64 down the bore in which the stripper rod 57 is a slack fit and through the air bleed passage 62 to help unseat the conical head 58 and to prevent the build-up of a vacuum between the formed material and the core 12 during the eventual stripping operation.

The slug forming and locating mechanism 24 . . . 30 is the same as that described with reference to FIGURES 2–4.

In operation, the slug 23 is injected into the mold cavity 10 (FIGURE 9) in the same way as previously until the material reaches the annular recess formed by the mating grooves 51, 52. At this point, air under pressure introduced through the inlet 56 and duct 54 to the annular nozzle 55 forces the material to roll over first against the wall of the groove 52 and then to continue to roll over following the wall of the groove 51, excess air being allowed to escape through the grooves 53 until these are sealed by the material. Thereafter, air pressure builds up within the rolled lip 66 until the free edge of the material meets the extruded wall at the point where the roll 66 begins. Any further rolling of the material will continue under the action of air pressure trapped in the interior of the roll 66.

After completion of the injection stage, the core 12 is separated axially from the outer mold 11 (see FIGURE 10) and air pressure acting through the pocket 64 and groove 62 forces the conical head 58 downwards to pull the formed cup away from the core, air escaping between the core 12 and the sleeve of formed material to prevent any vacuum effects from impeding the stripping action.

Figure 11:
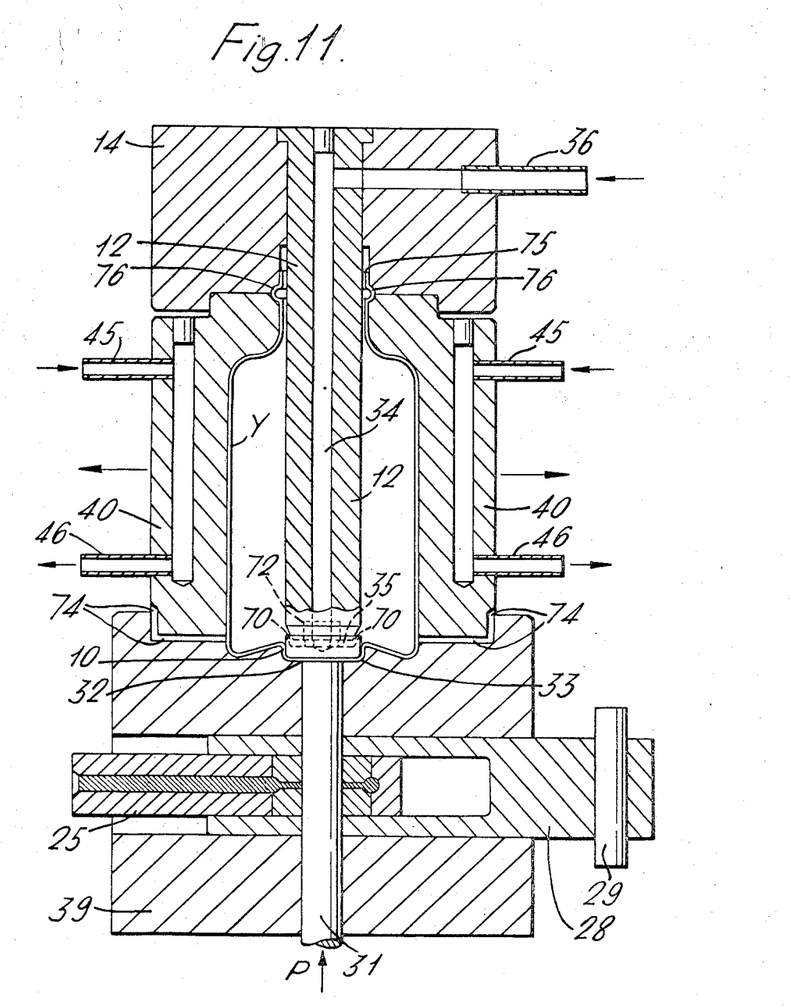
FIGURE 11 shows a sectional elevation of a fourth form of machine.
Figure 12:
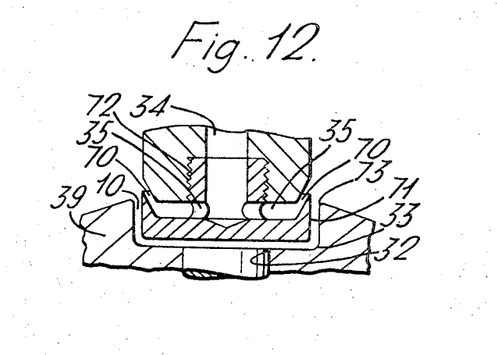
FIGURE 12 is an enlarged view of part of FIGURE 11.

FIGURES 11 and 12 illustrate the application of the invention to the forming of a necked bottle Y. In this case, the outer mold part is in two main axially separable sections 39, 40 as in FIGURES 5–8. The upper split main mold part 40 is internally contoured to the desired shape and the size of the bottle wall, whilst the core 12 is cylindrical. The base section 39 of the mold, however, is contoured as shown, a very short section of narrow cavity 10 being provided to ensure that when the material flows beyond the point 33 it is guided over the surface of the core 12. Hereafter, the material flows at constant wall thickness up the core 12, but since it is in an elastically deformed condition it clings to the core surface and, unless suitably lubricated, it begins to bind on the core as soon as it leaves the short cavity 10 and buckles. In the machine shown, this lubrication is provided by an annular curtain of air or other suitable fluid which is discharged from an upwardly inclined annular port 70 formed by opposing complementarily coned surfaces on the bottom end of the main core 12 and the top face of detachable nosepiece 71 carried on the main core 12 by means of a threaded spigot 72 screwed into a blind socket in the core end, the axial lengths of the spigot and the socket being accurately controlled to determine the size of the annular port 70. The port communicates by cross ducts 35 drilled radially through the spigot 72 to intersect an axial pressure fluid feed bore 34 which extends upwards from the point of intersection with the cross ducts to the upper end of the core 12 where it is blanked off in conventional manner. The upper end of the bore 34 communicates with a radial fluid input connection 36. The annular port 70 is located as closely as is practicable above the rim 73 of the cavity 10, and so long as air or fluid under pressure is fed at a sufficient rate of flow to the annular port, the extrusion is prevented from making high frictional contact with the core. It will be apparent therefore from the foregoing that it is desirable to apply the air or fluid at the start of the formation of the sleeve so that it does not bind on the core 12 as it leaves the cavity 10.

The separable mold parts 40 have grooves 74 machined in the bottom faces and these grooves are continued up the side walls for a sufficient distance to clear the rim of the recess in the bottom mold part 39 into which the separable parts 40 are fitted. These grooves 74 provide air bleeds for the escape of the lubricating air or fluid which is admitted through the annular port 70 during the travel of the extrusion up the core 12. In some cases it may also be necessary or advisable to provide corresponding air bleed passages in the top surfaces of the separable mold parts 40, although these are not shown in the drawing.

Extrusion of the thermoelastic material continues until it reaches a point, such as 75, beyond an annular groove 76 into which the material will subsequently be expanded for the formation of a rib around the neck of the bottle. Such a rib not only strengthens the resistance of the rim to distortion but also provides a conventional seal for a cap to be applied to the bottle when filled.

Figure 6:
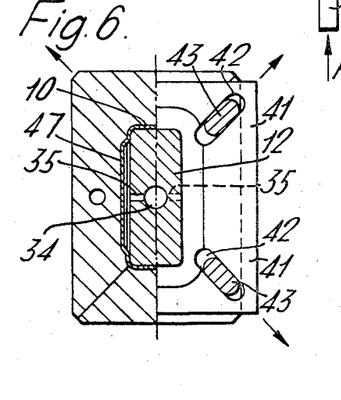
FIGURES 6 and 7 are sections on the line VI—VI and VII—VII respectively of FIGURE 5.
Figure 7:
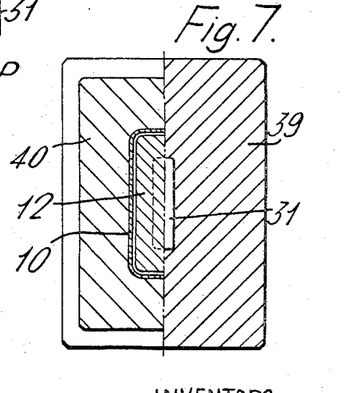
Figure 8:
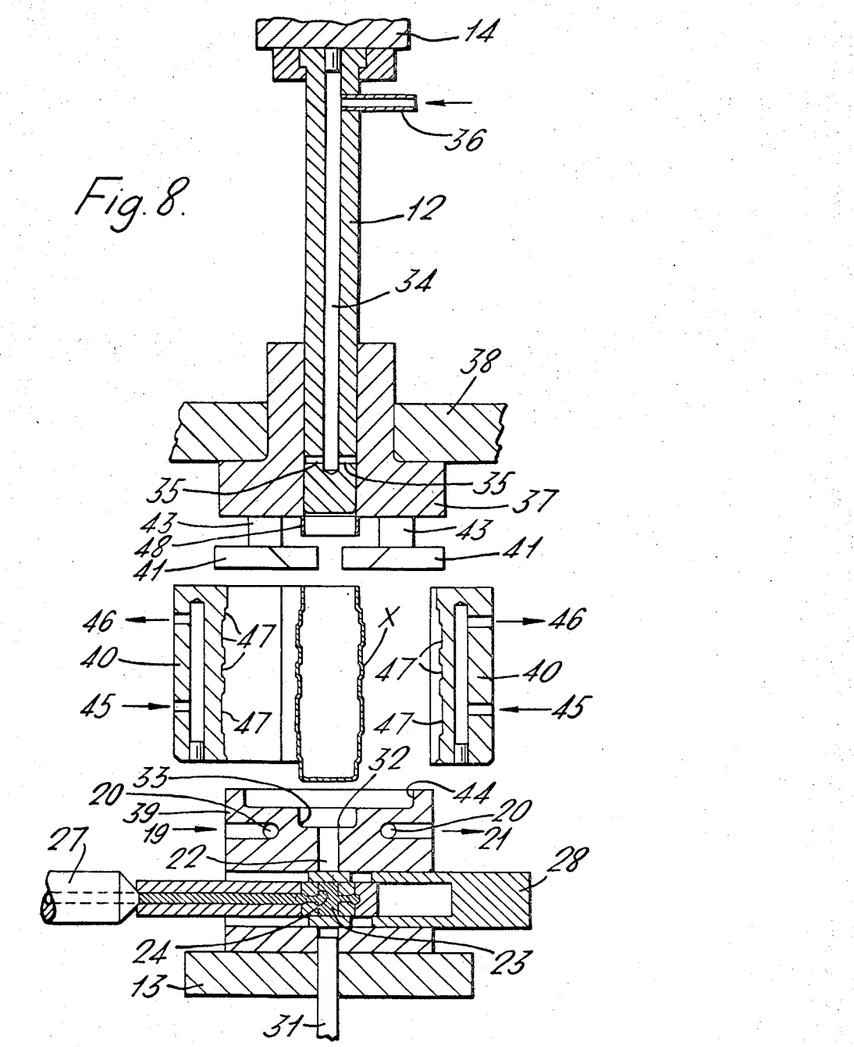
FIGURE 8 is an exploded sectional view similar to FIGURE 5 showing the product stripped from the mold.

As soon as the free edge of the material has reached the point 75, it is clamped by a suitable mechanism (not shown) which may be similar to the cutter mechanism shown at 41 in FIGURES 5, 6 and 8 and air under pressure is introduced through the longitudinal duct 34 and cross-ducts 35 to force the material away from the core 12. During this stage of the process, however, extrusion of the slug continues, so that while the material is being dilated against the internal wall surface of the mold part 40, no significant reduction in wall thickness will take place. At the same time, the additional material required to form the base of the bottle is being continuously supplied by the slug. On completion of the extrusion stage, the mold parts 39, 40 are separated and the bottle Y is stripped from the core in a similar manner to that of FIGURES 5–8.

Figure 13:
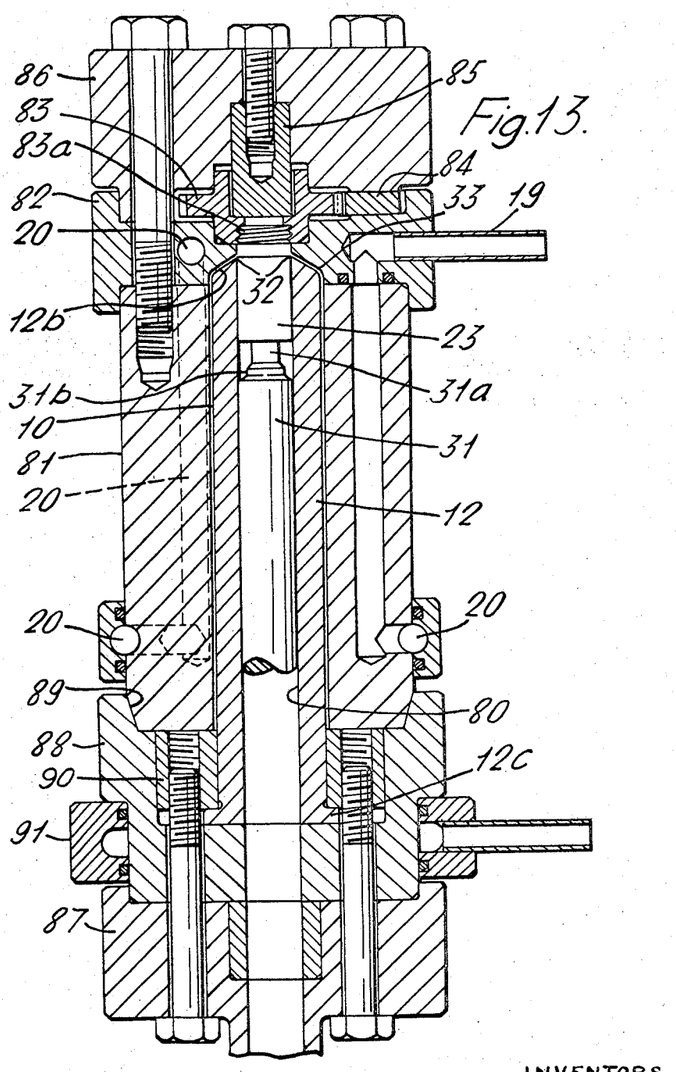
FIGURE 13 is a sectional elevation of a fifth form of machine.
Figure 14:
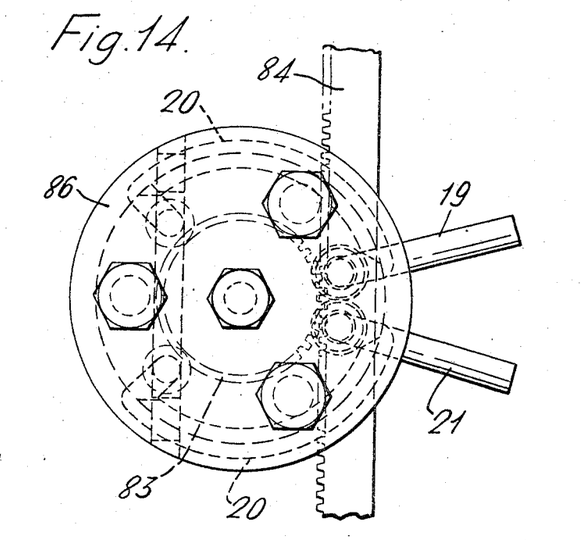
FIGURE 14 is a plan view of FIGURE 13.

In FIGURES 13 and 14, which show a machine for extruding long tubes having threaded nozzles, the ram 31 (FIGURE 13) works in a bore 80 in the core 12. The upper end of the core is shaped at 12b to the contour of a conical shoulder of the tube below the nozzle. The slug 23 is introduced into the bore 80 before the ram 31, and initially rests in the position shown in the drawing.

The outer mold part is again in two main sections 81, 82 with an additional section 83 which will form the screw thread on the neck. This last section is in the form of a gear wheel having a screw-threaded mold cavity 83a to form the required screw thread on the neck of the tube. This gear wheel meshes with a rack 84 (see also FIGURE 14) and is journalled on a stub shaft 85 locked in a mold header 86. In this construction of mold, however, the several mold sections are not separable. The finished tube is stripped from the mold by withdrawing the core 12, the initial withdrawal motion being accompanied by rotation of the gear wheel 83 by the rack 84 in the sense for unscrewing a cap from the nozzle.

The upper end of the ram 31 is reduced to present a plain coaxial spigot 31a of a length and diameter to form a smooth cylindrical discharge passage within the threaded cavity 83a of the gear-wheel mold section 83. The spigot 31a is joined to the ram 31 by a stepped shoulder 31b. This shoulder forms the transition of the internal bore of the tube between the top of the conical shoulder 12b of the core 12 and the smooth cylindrical discharge passage of the tube formed by the spigot 31a.

The core withdrawal assembly consists of a vertically reciprocable head 87 carrying a generally cup-shaped bolster 88 having a coned mouth 89 which is a snug fit over a complementarily coned lower and of the mold 81 when the mold is closed (FIGURE 13). Within the cup-shaped bolster is fitted a core clamping ring 90 which is a close fit over the lower end of the core and is accurately machined to seat against the base of the mold 81 and clamp a flange 12c on the bottom end of the core. The bolster 88 is surrounded by a water jacket 91. To strip the molded tube, the head 87 is drawn down by a conventional retraction mechanism (not shown) which is also coupled to the rack 84 so that the latter rotates the nut 83 in synchronism with the downward travel of the core 12.

In operation, the ram 31 is forced upwards to compress the slug 23 first into the threaded cavity 83a. When this is filled, the spigot 31a begins to penetrate the slug and forces molding material backwards over the shoulder 31b. When the space between spigot and shoulder and the wall of the bore 80 is filled, the material is forced through the annular gap 32 into the mold cavity 10 where conditions are similar to those of the preceding embodiments. When the tip of the spigot 31a reaches the stub shaft 85, the mold cavity 10 is filled, and stripping takes place.

Throughout the foregoing description with reference to FIGURES 2–14, the mold cavity 10 has an annular passage or end-wall portion lying in a radial or substantially radial plane between the extrusion gap 32 and the point 33, the ratio between the cross-sectional area of the slug pre-injection cavity 22 and the projected area at the point 33 being of the order of 1:2 or less in order to establish biaxial orientation in the extruded material. Although the mold cavities 10 have been shown as either generally parallel-sided or, as in the case of FIGURES 9 and 10, conical with a small cone angle, it is to be understood that other shapes of cavity beyond the point 33 are possible, such as saucer-shaped or having a re-entrant curvature. Where the final product is required to be open-ended, the annular or end-wall portion may be subsequently severed after molding. In all cases, however, it is desirable that the opposing surfaces of the mold 11 and the core 12 should be uniformly spaced between the extrusion gap 32 and the point 33 for the optimum conditions for establishment for biaxial orientation.

The mechanism for reciprocating the ram 31 in all cases may be either mechanical, electrical, or hydraulic, and is preferably of conventional design. The ram may, however, be constituted by an idle washer or gasket designed to form a pressure-tight gas seal, the extruding force being provided by the ignition of a propellant substance in a closed chamber.

We claim:

1. A method of forming a hollow thin-walled article by extruding a thermoelastically deformable material over a mold core having a central axis, which comprises the steps of:
   (1) molding a slug of the material having the required volume for the article being formed and a cross-sectional area less than that of the core,
   (2) positioning the molded slug axially of the core,
   (3) maintaining the slug at a temperature within the softening range of the molding material,
   (4) extruding the slug axially of the core against a member fixed relative thereto in order to divert it through an angle of at least 90° and to force it to flow laterally outwards in all directions simultaneously about the central axis and then axially directly onto the core to form a sleeve of the material,
   (5) maintaining the core at a temperature below the softening range of the molding material, and
   (6) controlling the rate of extrusion with respect to the temperature of the slug before extrusion and to the temperature of the core, such that the temperature of the material flowing laterally and onto the core remains below the melting point of the material but above a point at which the material freezes prematurely, thereby establishing a bi-axially oriented structure throughout substantially all the walls of the article thus formed.

2. The method according to claim 1 wherein fluid under pressure is applied between the core and the sleeve at the start of the formation of the latter on the core to assist the travel of the sleeve over the core.

3. The method according to claim 1, wherein the material is extruded through a narrow gap subtending an arc of 360° at the central axis into a mold cavity which contains the core, the material being confined axially of the core as it is being extruded laterally outwards such that it flows radially in a plane perpendicular to the axis of the core in order to induce internal tensile stresses in the material in that plane.

4. The method according to claim 1, wherein the slug of material is extruded outward of itself from a given cross-sectional area of the molded slug to the cross-sectional area of the core in a ratio not exceeding 1:2.

5. The method according to claim 1 wherein the temperature of the slug at extrusion is near the lower end of the softening range of the material.

6. The method according to claim 1 of extruding the material into a mold cavity containing the core, wherein the spaces between at least parts of the outer wall of the cavity and the core are significantly wider than the thickness of the sleeve of material as it is extruded onto the core, which method further includes the step of expanding the sleeve on the core by the application of internal fluid pressure into contact with the outer wall of the mold after the sleeve has traveled the full length of the core.

7. The method according to claim 6, which includes the step of continuing to extrude the material into the mold cavity while the sleeve is being expanded.

References Cited

UNITED STATES PATENTS

| | | | |
|---|---|---|---|
| 3,198,866 | 8/1965 | Covington | 264—320 X |
| 3,288,898 | 11/1966 | West. | |
| 2,878,513 | 3/1959 | Slaughter | 264—320 |
| 3,184,524 | 5/1965 | Whiteford | 264—97 |
| 3,172,929 | 3/1965 | Santelli | 264—97 |
| 3,231,656 | 1/1966 | Ninneman | 264—329 |
| 3,170,970 | 2/1965 | Adams | 264—97 X |
| 3,249,660 | 5/1966 | King | 18—5 |
| 3,137,038 | 6/1964 | Maynard | 264—329 X |

ROBERT F. WHITE, *Primary Examiner.*

A. R. NOE, *Assistant Examiner.*

U.S. Cl. X.R.

18—5, 30; 264—89, 323